US008749732B2

(12) United States Patent
Ji et al.

(10) Patent No.: US 8,749,732 B2
(45) Date of Patent: Jun. 10, 2014

(54) LIQUID CRYSTAL DISPLAY DEVICE INCLUDING LED LIGHT SOURCE

(75) Inventors: Byung-Hwa Ji, Goyang-si (KR); Heong-Soo Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 466 days.

(21) Appl. No.: 12/654,164

(22) Filed: Dec. 11, 2009

(65) Prior Publication Data

US 2010/0283936 A1    Nov. 11, 2010

(30) Foreign Application Priority Data

May 6, 2009  (KR) ......................... 10-2009-0039200

(51) Int. Cl.
*G02F 1/1335*  (2006.01)
*G02F 1/1333*  (2006.01)
*F21V 7/04*  (2006.01)

(52) U.S. Cl.
USPC ................ 349/67; 349/58; 362/609; 362/612

(58) Field of Classification Search
USPC ................. 349/58, 65, 67; 362/606, 609, 612
See application file for complete search history.

(56) References Cited

U.S. PATENT DOCUMENTS

| | | | | |
|---|---|---|---|---|
| 5,688,035 | A * | 11/1997 | Kashima et al. | 362/609 |
| 6,285,420 | B1 * | 9/2001 | Mizumo et al. | 349/65 |
| 6,295,105 | B1 * | 9/2001 | Lee et al. | 349/65 |
| 7,083,318 | B2 * | 8/2006 | Ha et al. | 362/633 |
| 7,206,040 | B2 * | 4/2007 | Kano | 349/67 |
| 7,518,670 | B2 * | 4/2009 | Song et al. | 349/58 |
| 7,649,590 | B2 * | 1/2010 | Park et al. | 349/65 |
| 7,771,100 | B2 * | 8/2010 | Yamamoto et al. | 362/606 |
| 8,134,658 | B2 * | 3/2012 | Shiraishi | 349/65 |
| 8,253,875 | B2 * | 8/2012 | Kim | 349/58 |
| 2003/0081402 | A1 * | 5/2003 | Jeon et al. | 362/26 |
| 2005/0036296 | A1 * | 2/2005 | Kim et al. | 362/31 |
| 2007/0058392 | A1 * | 3/2007 | Watanabe et al. | 362/612 |
| 2007/0091222 | A1 * | 4/2007 | Huo et al. | 349/58 |
| 2007/0121023 | A1 * | 5/2007 | Yang | 349/58 |
| 2007/0147074 | A1 * | 6/2007 | Sakai et al. | 362/608 |
| 2007/0153155 | A1 * | 7/2007 | Chung et al. | 349/58 |
| 2007/0165420 | A1 * | 7/2007 | Weng et al. | 362/609 |
| 2008/0055518 | A1 * | 3/2008 | Jung | 349/67 |
| 2008/0101093 | A1 * | 5/2008 | Yoon et al. | 362/630 |

FOREIGN PATENT DOCUMENTS

| | | |
|---|---|---|
| CN | 101017278 | 8/2007 |
| JP | 2005-135860 | 5/2005 |
| KR | 10-2008-0052828 | 6/2008 |
| KR | 20080083411 A | 9/2008 |

* cited by examiner

*Primary Examiner* — Mark Robinson
*Assistant Examiner* — Robert Tavlykaev
(74) *Attorney, Agent, or Firm* — McKenna, Long & Aldridge LLP

(57) ABSTRACT

A liquid crystal display device includes a support main having a rectangular frame shape, a reflection sheet in the support main, a light guide plate over the reflection sheet, a light-emitting diode (LED) assembly including LEDs arranged along a light-incident surface of the light guide plate and a printed circuit board (PCB) on which the LEDs are mounted, an LED housing partially covering the LED assembly and including first and second portions, wherein the PCB is attached to the first portion, and the second portion is perpendicular to the first portion, a plurality of optical sheets over the light guide plate, a liquid crystal panel over the plurality of optical sheets, a cover bottom at a rear surface of the reflection sheet and having at least one side wall, and a top cover covering edges of a front surface of the liquid crystal and combined with the support main and the cover bottom.

10 Claims, 8 Drawing Sheets
(5 of 8 Drawing Sheet(s) Filed in Color)

LIQUID CRYSTAL DISPLAY DEVICE INCLUDING LED LIGHT SOURCE

The invention claims the benefit of Korean Patent Application No. 10-2009-0039200 filed in Korea on May 6, 2009, which is hereby incorporated by reference for all purposes as if fully set forth herein.

BACKGROUND OF THE INVENTION

1. Field of the Invention

The invention relates to a liquid crystal display device, and more particularly, to a liquid crystal display device including a light-emitting diode (LED) light source.

2. Discussion of the Related Art

Liquid crystal display (LCD) devices are most widely used for monitors of notebook computers, monitors of personal computers and televisions due to excellent moving images and high contrast ratio. LCD devices use the optical anisotropy and polarization properties of liquid crystal molecules of a liquid crystal layer to produce an image.

An LCD device includes two substrates spaced apart and facing each other and a liquid crystal layer interposed between the two substrates. The alignment direction of the liquid crystal molecules is controlled by varying the intensity of an electric field applied to the liquid crystal layer, and the transmittance of light through the liquid crystal layer is changed.

The LCD devices require an additional light source because the LCD devices are not self-luminescent. Therefore, a backlight unit is disposed at a rear side of a liquid crystal (LC) panel and emits light into the LC panel, whereby discernible images can be displayed.

Backlight units include cold cathode fluorescent lamps (CCFLs), external electrode fluorescent lamps (EEFLs), and light emitting diodes (LEDs) as a light source. Among these, LED lamps have been widely used due to their small sizes, low power consumption, and high reliability.

FIG. 1 is a cross-sectional view illustrating a liquid crystal display (LCD) module including LEDs as a light source according to the related art.

In FIG. 1, the related art LCD module includes a liquid crystal panel 10, a backlight unit 20, a support main 30, a top cover 40 and a cover bottom 50.

The liquid crystal panel 10 displays images and includes first and second substrates 12 and 14 facing and attached to each other with a liquid crystal layer (not shown) interposed therebetween. Polarizers 19a and 19b are attached at front and rear surfaces of the liquid crystal panel 10 and control the polarization of light.

The backlight unit 20 is disposed at a rear side of the liquid crystal panel 10. The backlight unit 20 includes an LED assembly 29, a reflection sheet 25, a light guide plate 23 and a plurality of optical sheets 21. The LED assembly 29 is disposed at an edge of at least one side of the support main 30 along a length direction. The reflection sheet 25 is disposed over the cover bottom 50 and is white- or silver-colored. The light guide plate 23 is disposed over the reflection sheet 25. The plurality of optical sheets 21 are disposed over the light guide plate 23.

The LED assembly 29 is disposed at a side of the light guide plate 23. The LED assembly 29 includes a plurality of LEDs 29a emitting white light and a printed circuit board (PCB) 29b on which the LEDs 29a are mounted.

Edges of the liquid crystal panel 10 and the backlight unit 20 are surrounded by the support main 30 having a rectangular frame shape. The top cover 40 covers edges of the front surface of the liquid crystal panel 10, and the cover bottom 50 covers a rear surface of the backlight unit 20. The top cover 40 and the cover bottom 50 are combined to with the support main 30 to thereby constitute one-united body.

FIG. 2 is a cross-sectional view of enlarging an area A of FIG. 1. In FIG. 2, the LEDs 29a are arranged along the side of the light guide plate 23 of the LCD module, and the LEDs 29a are mounted on the PCB 29b to constitute the LED assembly 29. The LED assembly 29 is fixed by a bonding method such that lights emitted from the LEDs 29a face a side surface of the light guide plate 23, which the lights are incident on and which is referred to as a light-incident surface hereinafter. To do this, the cover bottom 50 has a side wall that is formed by bending an edge portion of the cover bottom 50 upward. The LED assembly 29 is attached to the side wall of the cover bottom 50 by an adhesive material such as a both-sided sticky tape. The structure may be referred to as a side top view type.

Accordingly, lights emitted from the LEDs 29a are incident on the light-incident surface of the light guide plate 23 and then are refracted toward the liquid crystal panel 10 inside the light guide plate 23. With lights reflected by the reflection sheet 25, the lights are changed to have uniform brightness and high qualities through the plurality of optical sheets 21 and are provided to the liquid crystal panel 10. Accordingly, the liquid crystal panel 10 displays images.

However, there are several problems in the LCD device including the backlight unit 20. Specially, the LCD device does not include a guiding means such that all the lights emitted from the LEDs 29a go to the light guide plate 23. Thus, some of lights emitted from are lost between the LED 29a and the light guide plate 23, and there is loss of light in the LCD device.

FIG. 3 is a view of showing a simulation result of changes in luminous flux after lights emitted from the LEDs 29a of FIG. 2 are changed into a plane light source by the light guide plate 23 of FIG. 2 according to the related art. Here, the unit of luminous flux is lm (lumen) in the International System of Units. As the luminous flux gets high, the quantity of light also gets high.

In the simulation result, as it goes from green to red, the luminous flux gets high. That is, there is no luminous flux in green, and the luminous flux increases as it goes from yellow to red.

Here, an ideal change in the luminous flux is as follows. There is no luminous flux in a side edge portion of the LCD device, where the LEDs 29a of FIG. 2 are disposed and which is a non-display area excluding pixels, and thus the side edge portion is shown as green. In the other portions of the LCD device, where the lights emitted from the LEDs 29a of FIG. 2 are incident on the light guide plate 23 of FIG. 2 and changed into the plane light source, there is high luminous flux, and thus the other portions are shown as red.

However, according to FIG. 3, there exists yellow between green and red. In yellow, the luminous flux is lower than red, and there is the loss of light. Here, yellow corresponds to a region between the LEDs 29a of FIG. 2 and the light-incident surface of the light guide plate 23 of FIG. 2. Accordingly, it is found that there occurs the loss of light between the LEDs and the light guide plate.

When a total luminous flux of the lights emitted from the LEDs 29a of FIG. 2 is 100 lm, the plane light source from the light guide plate 23 of FIG. 2 has the luminous flux of 79.74 lm. Therefore, the loss of the luminous flux may be about 20 lm.

This causes lowering of the qualities of the LCD device such as the brightness and image qualities.

SUMMARY OF THE INVENTION

Accordingly, the present invention is directed to a liquid crystal display device including an LED light source that substantially obviate one or more of the problems due to limitations and disadvantages of the related art.

An advantage of the present invention is to provide a liquid crystal display device including an LED light source that prevents the loss of light.

Another advantage of the present invention is to provide a liquid crystal display device including an LED light source that has the improved brightness and image qualities.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes a support main having a rectangular frame shape, a reflection sheet in the support main, a light guide plate over the reflection sheet, a light-emitting diode (LED) assembly including LEDs arranged along a light-incident surface of the light guide plate and a printed circuit board (PCB) on which the LEDs are mounted, an LED housing partially covering the LED assembly and including first and second portions, wherein the PCB is attached to the first portion, and the second portion is perpendicular to the first portion, a plurality of optical sheets over the light guide plate, a liquid crystal panel over the plurality of optical sheets, a cover bottom at a rear surface of the reflection sheet and having at least one side wall, and a top cover covering edges of a front surface of the liquid crystal and combined with the support main and the cover bottom.

It is to be understood that both the foregoing general description and the following detailed description are exemplary and explanatory and are intended to provide further explanation of the invention as claimed.

BRIEF DESCRIPTION OF THE DRAWINGS

The patent application file contains at least one drawing executed in color. Copies of this patent application publication with color drawings will be provided by the Office upon request and payment of the necessary fee.

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a cross-sectional view illustrating an LCD module including LEDs as a light source according to the related art;

FIG. 2 is a cross-sectional view of enlarging an area A of FIG. 1;

FIG. 3 is a view of showing a simulation result of changes in luminous flux after lights emitted from LEDs are changed into a plane light source by a light guide plate according to the related art;

FIG. 4 is an exploded perspective view of illustrating an LCD module according to an exemplary embodiment of the present invention;

FIG. 5 is a perspective view of an LED housing according to the exemplary embodiment of the present invention;

FIG. 6 is a cross-sectional view of schematically illustrating a part of a modularized LCD device of FIG. 4;

FIG. 7 is a perspective view of an LED housing according to another embodiment of the present invention;

FIG. 8 is a view of showing a simulation result of changes in luminous flux after lights emitted from LEDs are changed into a plane light source by a light guide plate according to the present invention;

Figure 9A:
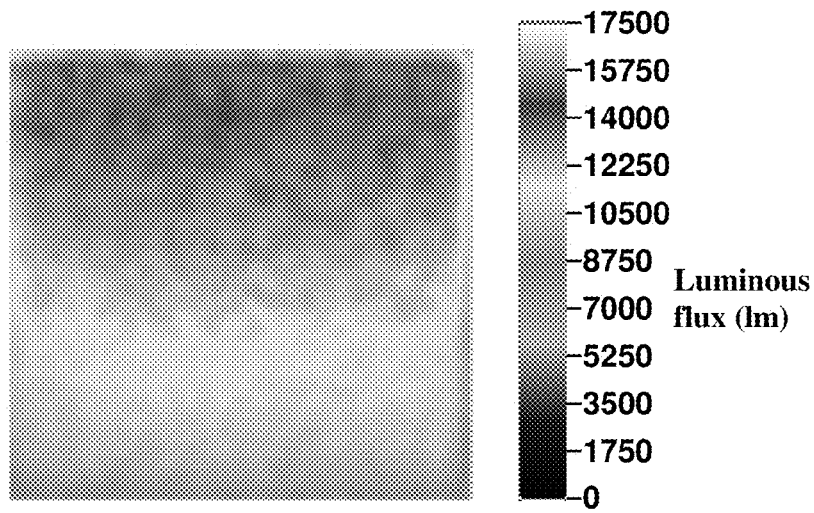
Figure 9B:
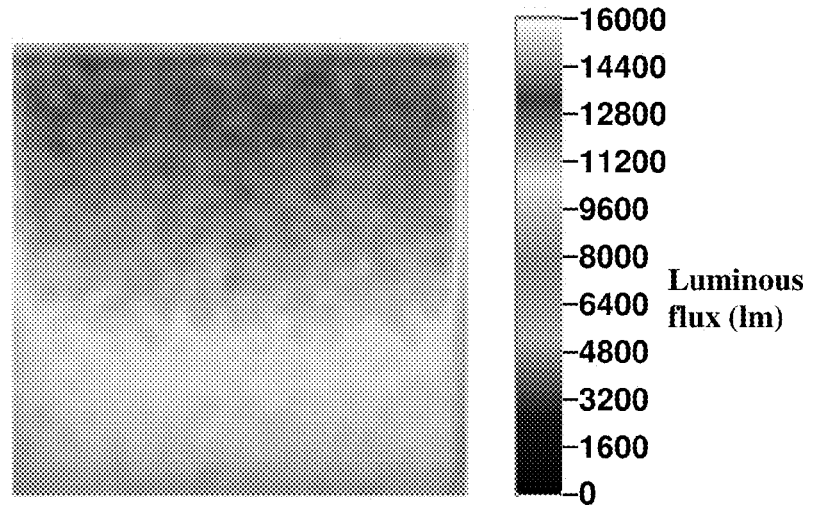
Figure 9C:
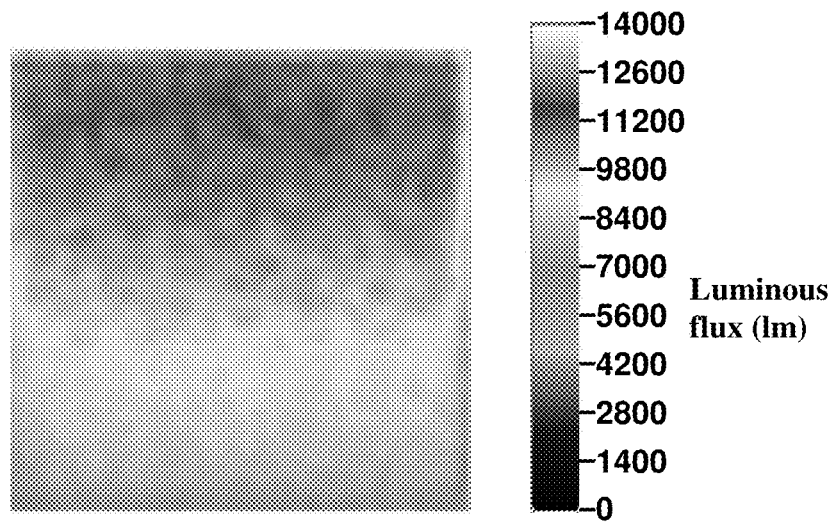
Figure 10A:
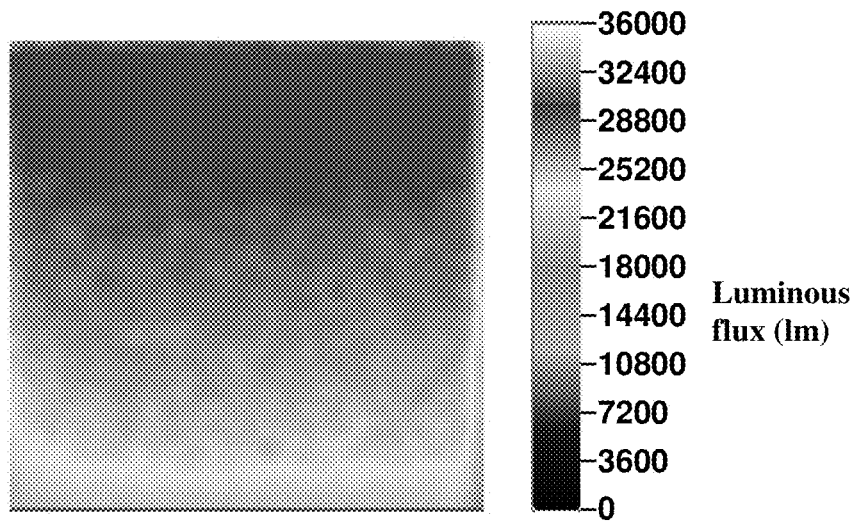
Figure 10B:
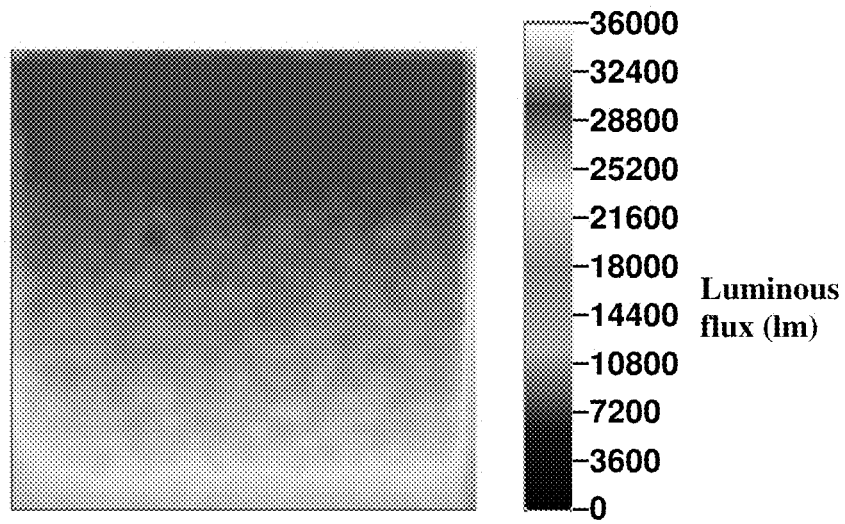
Figure 10C:
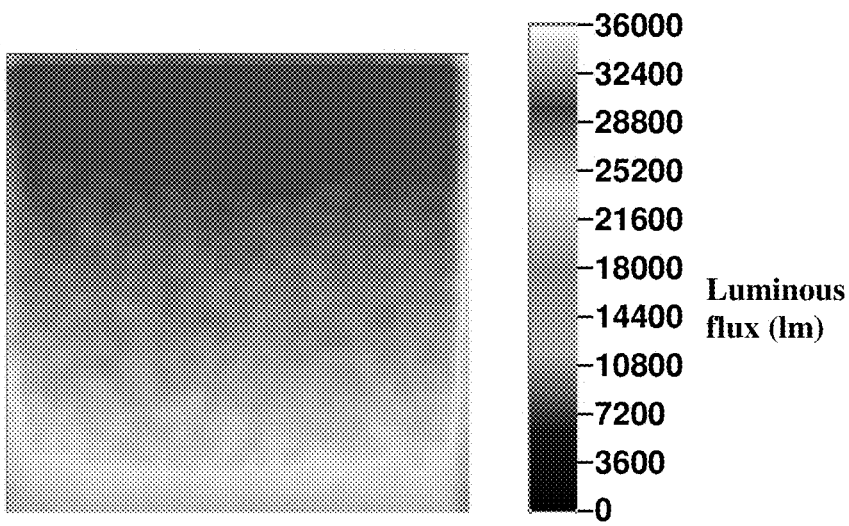

FIGS. 9A to 9C are views of showing simulation results of changes in luminous flux after lights emitted from LEDs are changed into a plane light source by a light guide plate according to the related art; and FIGS. 10A to 10C are views of showing simulation results of changes in luminous flux after lights emitted from LEDs disposed inside an LED housing are changed into a plane light source by a light guide plate according to the present invention.

DETAILED DESCRIPTION OF THE PREFERRED EMBODIMENTS

Reference will now be made in detail to an embodiment of the present invention, an example of which is illustrated in the accompanying drawings.

Figure 1:
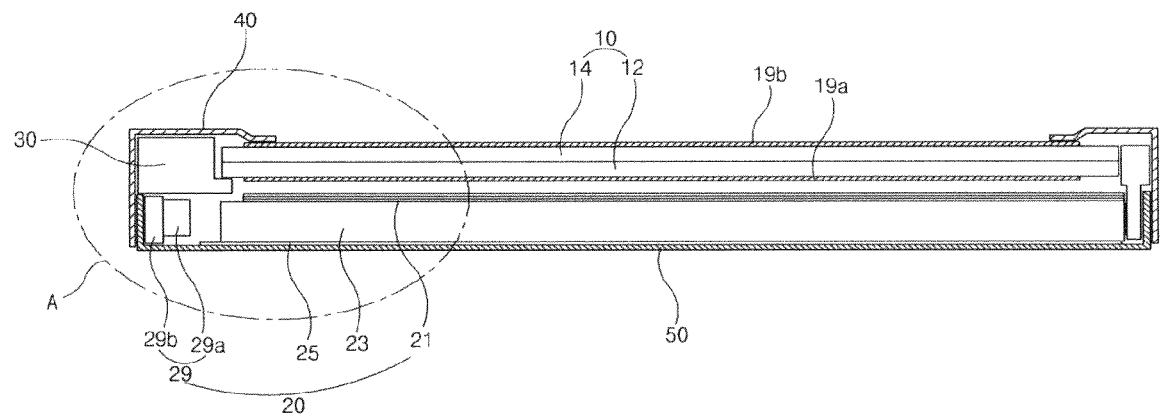
Figure 2:
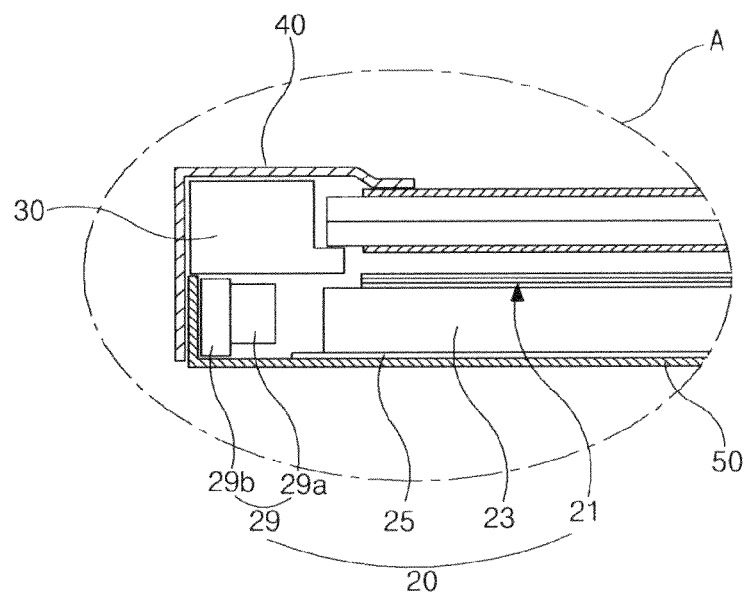
Figure 3:
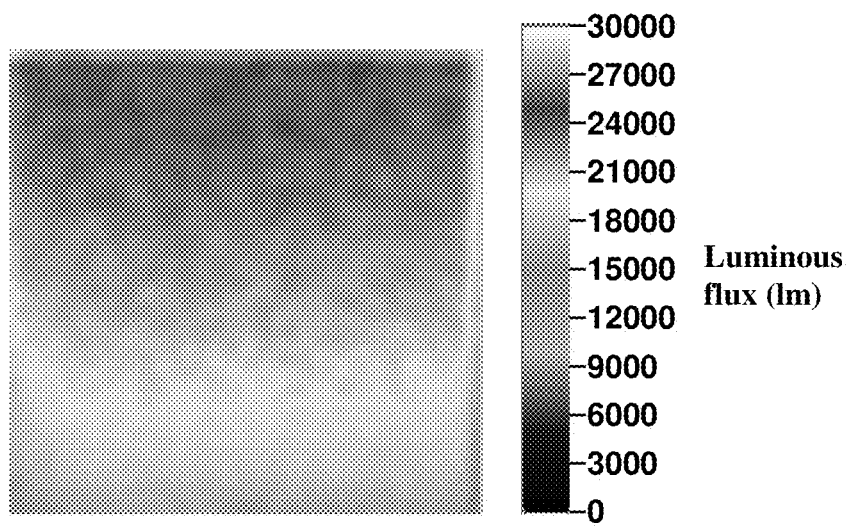
Figure 4:
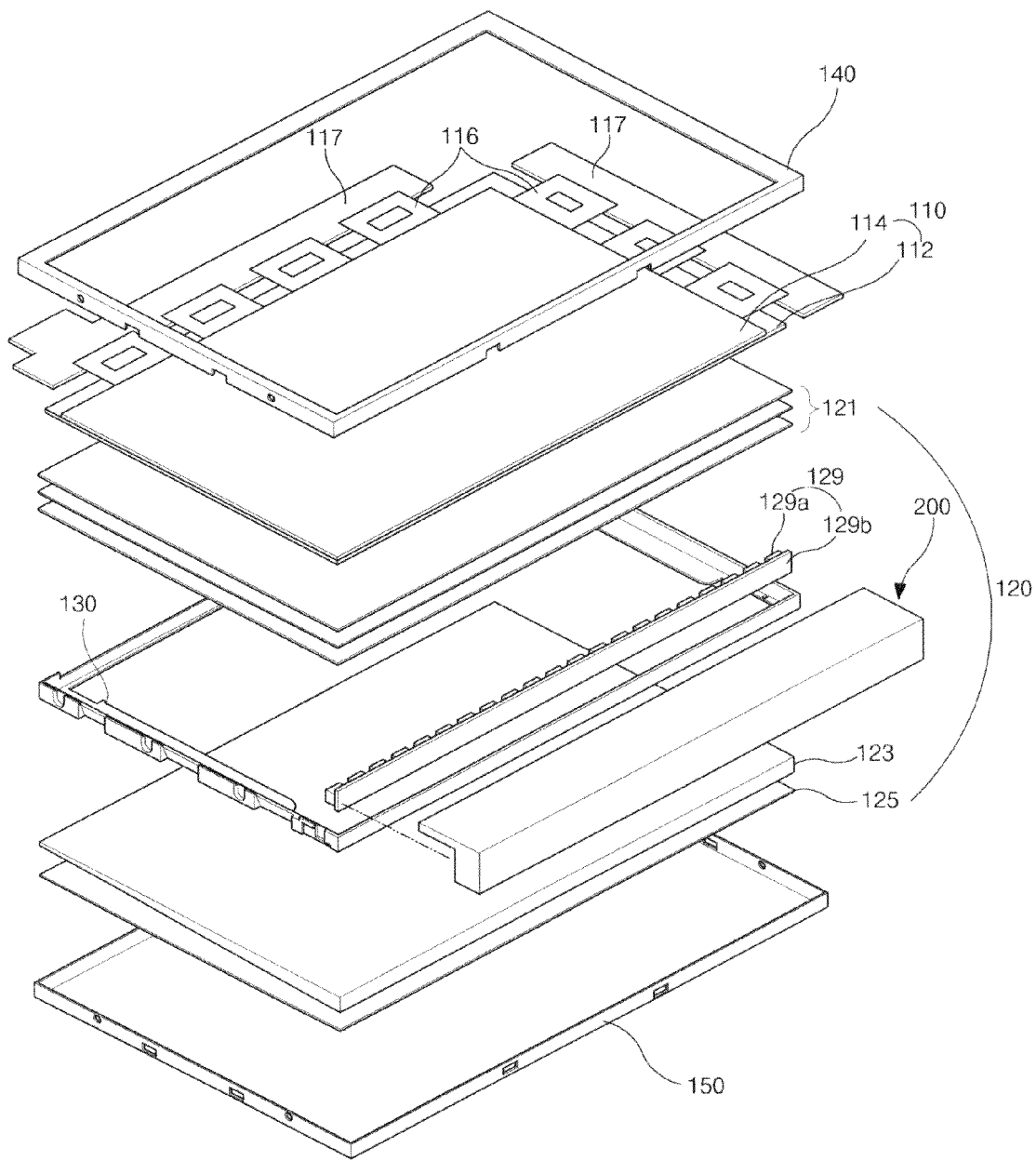

FIG. 4 is an exploded perspective view of illustrating an LCD module according to an exemplary embodiment of the present invention.

In FIG. 4, an LCD module includes a liquid crystal panel 110, a backlight unit 120, a support main 130, a top cover 140 and a cover bottom 150.

More particularly, the liquid crystal panel 110 displays images. The liquid crystal panel 110 includes first and second substrates 112 and 114 facing and attached to each other with a liquid crystal layer (not shown) interposed therebetween. In an active matrix-type, although not shown in the figure, gate lines and data lines are formed on an inner surface of the first substrate 112, which may be referred to as a lower substrate or an array substrate. The gate lines and the data lines cross each other to define pixel regions. A thin film transistor (TFT) is formed at each crossing point of the gate and data lines, and a pixel electrode is connected to the thin film transistor at each pixel region. The pixel electrode may be formed of a transparent conductive material.

A black matrix and red, green and blue color filter patterns are formed on an inner surface of the second substrate 114, which may be referred to as an upper substrate or a color filter substrate. The color filter patterns correspond to the pixel regions, respectively. The black matrix surrounds each of the color filter patterns and covers the gate lines, the data lines, and the thin film transistors. A transparent common electrode is formed over the color filter patterns and the black matrix.

Polarizers (not shown) are attached to outer surfaces of the first and second substrates 112 and 114 and selectively transmit linearly polarized light.

A printed circuit board 117 is attached to at least a side of the liquid crystal panel 110 via connecting means 116 such as flexible printed circuit boards or tape carrier packages (TCPs), for example. The printed circuit board 117 is bent toward a side surface of the support main 130 or a rear surface of the cover bottom 150 during a module assembly process.

In the liquid crystal panel 110, on/off signals from gate driving circuits are provided to the thin film transistors through the gate lines, and when the thin film transistors selected by each gate line turn on, data signals from data driving circuits are provided to the pixel electrodes through the data line. According to this, an electric field is induced between the pixel electrodes and the common electrode, and the arrangement of the liquid crystal molecules is changed by the electric field to thereby change transmittance of light. Therefore, the liquid crystal panel 110 displays variances in the transmittance as images.

The backlight unit 120 is disposed under the liquid crystal panel 110 and provides light to the liquid crystal panel 110 so that the variances in the transmittance of the liquid crystal panel 110 are shown to the outside.

The backlight unit 120 includes a light-emitting diode (LED) assembly 129, a reflection sheet 125 of a white or silver color, a light guide plate 123 over the reflection sheet 125, and optical sheets 121 over the light guide plate 123.

The LED assembly 129 is disposed at a side of the light guide plate 123 such that the LED assembly 129 faces a light-incident surface of the light guide plate 123, which light is incident on. The LED assembly 129 includes a plurality of LEDs 129a and a printed circuit board (PCB) 129b on which the LEDs 129a are mounted to be spaced apart from each other.

The LEDs 129a include red (R), green (G) and blue (B) LEDs respectively emitting red, green and blue lights toward the light-incident surface of the light guide plate 123. A white light is produced by lighting the RGB LEDs 129a up at a time and then mixing the red, green and blue lights.

Alternatively, each of the LEDs 129a may include LED chips emitting red, green and blue lights, and each LED 129a may produce a white light. The LED 129a may include a chip emitting a white light and emit a full white light.

Meanwhile, the LEDs 129a respectively emitting red, green and blue lights may be mounted as a cluster, and the plurality of LEDs 129a may be arranged on the PCB 129b in a line or in several lines.

Especially, the LED assembly 129 is guided by an LED housing 200. The LED housing 200 may be formed of a metallic material. The LED housing 200 has an opened inner side, which faces the light-incident surface of the light guide plate 123, and covers an outer side of the LED assembly 129.

The LED housing 200 protects the LED assembly 129 and concentrates light from the LED assembly 129 to the light guide plate 123 to thereby prevent loss of light and improve radiation effects of heat. This will be explained in more detail later.

The light guide plate 123 totally reflects lights emitted from the LEDs 129a several times such that the lights move through the inside of the light guide plate 123 and are uniformly scattered. Accordingly, an initial flat light source is provided to the liquid crystal panel 110. To provide a uniform flat light source, the light guide plate 123 may include predetermined patterns at its rear surface. Here, to guide the lights incident on the inside of the light guide plate 123, the patterns may be elliptical patterns, polygonal patterns or hologram patterns. The patterns may be formed by a printing method or an injecting method.

The reflection sheet 125 is disposed under the rear surface of the light guide plate 123. The reflection sheet 125 reflects lights passing through the rear surface of the light guide plate 123 toward the liquid crystal panel 110 to increase the brightness.

The optical sheets 121 over the light guide plate 123 include a diffuser sheet and at least a light-concentrating sheet. The optical sheets 121 diffuse or concentrate lights passing through the light guide plate 123 such that more uniform flat light source is provided to the liquid crystal panel 110.

The liquid crystal panel 110 and the backlight unit 120 are modularized with the top cover 140, the support main 130 and the cover bottom 150. The top cover 140 has a rectangular frame shape with an L-shaped cross-section to cover edges of a front surface and side surfaces of the liquid crystal panel 110. A front surface of the top cover 140 has an opening, wherein images of the liquid crystal panel 110 are displayed through the opening.

The cover bottom 150, which the liquid crystal panel 110 and the backlight unit 120 are disposed over and which is a base of the liquid crystal display module, has a rectangular plate shape, and four edges of the cover bottom 150 are bent perpendicularly toward the liquid crystal panel 110. Thus, the cover bottom 150 may include a bottom wall and four side walls.

The support main 130 has a rectangular frame shape with an opened side. The support main 130 is disposed over the cover bottom 150 and surrounds edges of the liquid crystal panel 110 and the backlight unit 120. The support main 130 is combined with the top cover 140 and the cover bottom 150.

The top cover 140 may be referred to as a case top or a top case, the support main 130 may be referred to as a guide panel, a main support or a mold frame, and the cover bottom 150 may be referred to as a bottom cover or a lower cover.

The backlight unit 120 having the above-mentioned structure may be referred to as a side light type. The LEDs 120a may be arranged on the PCB 129b in several lines according to purposes. Furthermore, one or more LED assemblies 129 may be disposed at each of opposite side walls of the cover bottom 150 facing each other and may correspond to each other.

In an LCD device having the above-mentioned structure, there is no loss of light between the LEDs 129a and the light-incident surface of the light guide plate 123 due to the LED housing 200 guiding the LED assembly 129. Accordingly, it can be prevented to lower qualities of the LCD device such as the brightness and image qualities.

Figure 5:
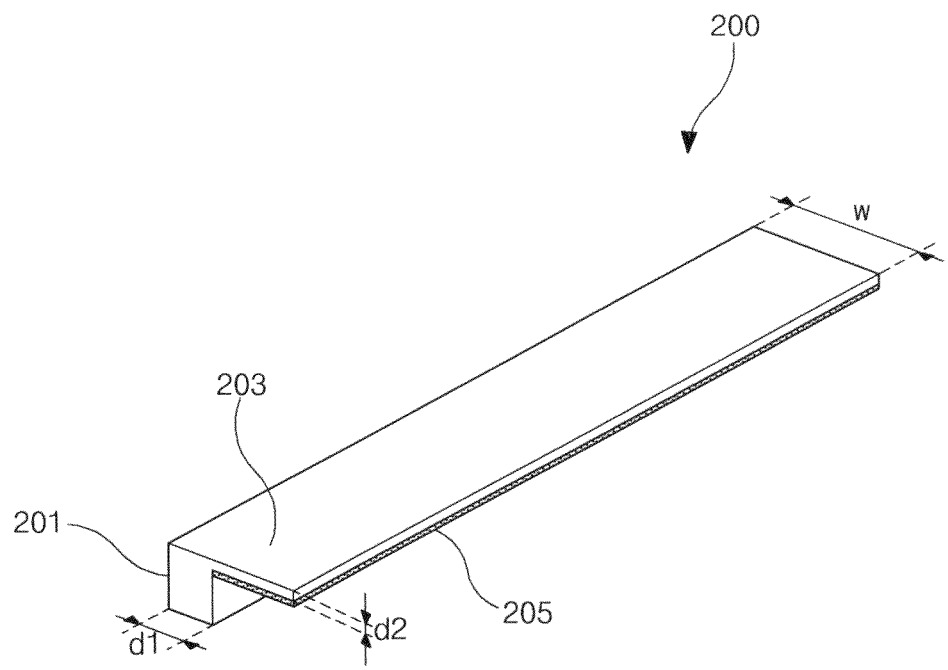

FIG. 5 is a perspective view of an LED housing according to an exemplary embodiment of the present invention.

In FIG. 5, the LED housing 200 protects the LED assembly 129 of FIG. 4 and concentrates light from the LED assembly 129 to the light guide plate 123 of FIG. 4 to thereby prevent loss of light and improve the radiation effects of heat.

The LED housing 200 includes a first portion 201 and a second portion 203. The first portion 201 has an opened inner side, which faces a side of the light guide plate 123 of FIG. 4, that is, the light-incident surface of the light guide plate, and contacts the side wall of the cover bottom 150 of FIG. 4. The second portion 203 is perpendicular to the first portion 201 and guides an upper side of the LED assembly 129 of FIG. 4 in the context of the figure. In other words, the first portion 201 is disposed on one side of the second portion 203, and the first portion 201 has a width and a thickness different from the second portion 203.

Accordingly, the LED housing 200 has a cross-section of an "L" shape in order to cover the upper side and an outer side of the LED assembly 129 of FIG. 4 in the context of the figure. The LED housing 200 has a length corresponding to the LED assembly 129 of FIG. 4, and the second portion 203 of the LED housing 200 has a width "w" so as to completely cover the upper side of the LED assembly 129 of FIG. 4 in the context of the figure. It is desirable that the second portion 203 of the LED housing 200 also covers a part of the light guide plate 123 of FIG. 4 facing the LED assembly 129 of FIG. 4.

The PCB 129b of FIG. 4 of LED assembly 129 of FIG. 4 is attached to the first portion 201 of the LED housing 200 by an adhesive material (not shown) such as a both-sided sticky tape. The LED housing 200 covers the upper and outer sides of the LED assembly 129 of FIG. 4 to protects the LED assembly 129 of FIG. 4 and concentrate light to the light guide plate 123 of FIG. 4. Accordingly, loss of light can be prevented between the LED assembly 129 of FIG. 4 and the light guide plate 123 of FIG. 4.

Meanwhile, since the LEDs 129a of FIG. 4 are elements emitting light, temperatures rapidly go up according as time passes, and this causes changes in the brightness. Therefore, when the LEDs 129a of FIG. 4 are used as a light source of the backlight unit 120 of FIG. 4, it is important to design conditions for radiation of heat due to increasing temperatures of the LEDs 129a of FIG. 4. In the present invention, the LED housing 200 is formed of a metallic material so that heats from the LEDs 129a of FIG. 4 are transmitted to the LED housing 200 and discharged to the outside quickly.

Here, to further increase discharge effects of heat, the thickness "d1" of the first portion 201 of the LED housing 200, beneficially, is thicker than the thickness "d2" of the second portion 203. A direction of the thickness "d1" of the first portion 201 is perpendicular to a direction of the thickness "d2" of the second portion 203.

A reflective layer 205 having relatively high reflectance may be formed on an inner surface of the LED housing 200, which faces the LED assembly 129 of FIG. 4, more particularly, an inner surface of the second portion 203. The reflective layer 205 may be formed by applying appropriate resin to the inner surface of the LED housing 200. Alternatively, the reflective layer 205 may be made from an end portion of the reflection sheet 125 of FIG. 4, which is formed to have the same shape as the inner surface and is stuck to the inner surface of the LED housing 200.

The reflective layer 205 prevents the loss of light and maximally concentrates lights emitted from the LED assembly 129 of FIG. 4 to the light-incident surface of the light guide plate 123 of FIG. 4.

Figure 6:
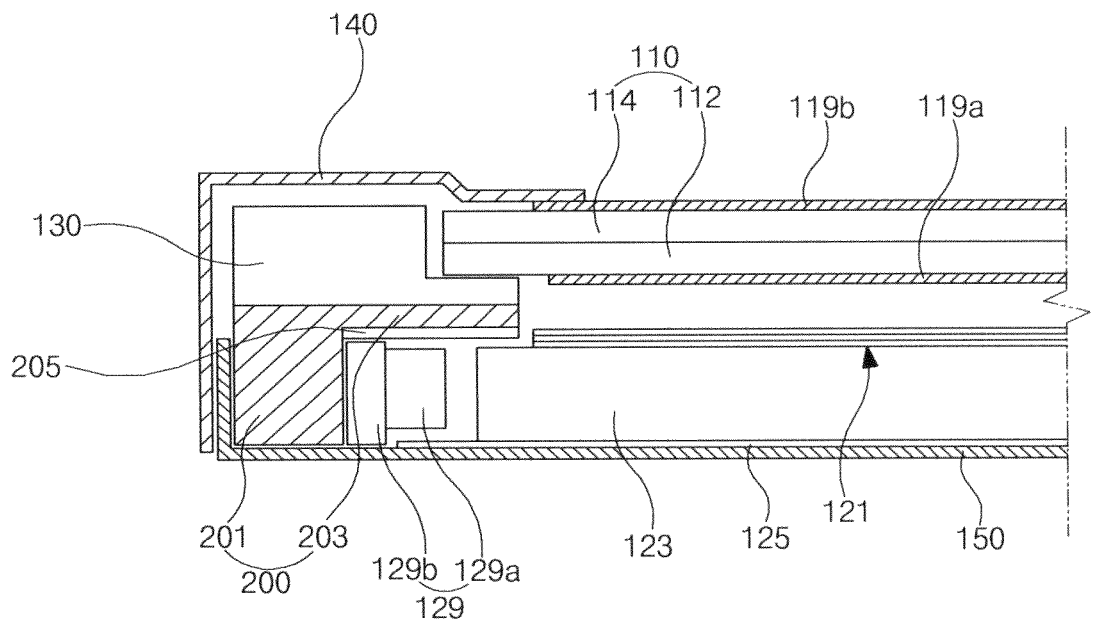

FIG. 6 is a cross-sectional view of schematically illustrating a part of a modularized liquid crystal display (LCD) device of FIG. 4. In FIG. 6, the reflection sheet 125, the light guide plate 123, the LED assembly 129 at the side of the light guide plate 123, and the plurality of optical sheets 121 over the light guide plate 123 constitute the backlight unit.

The liquid crystal panel 110 is disposed over the backlight unit and includes the first and second substrates 112 and 114 and the liquid crystal layer (not shown) interposed therebetween. The polarizers 119a and 119b selectively transmitting light are attached at outer surfaces of the first and second substrates 112 and 114, respectively.

The edges of the backlight unit and the liquid crystal panel 110 are surrounded by the support main 130. The support main 130 is combined with the cover bottom 150 disposed at the rear surface of the backlight unit and the top cover 140 surrounding the edges of the front surface and the side surfaces of the liquid crystal panel 110.

Even though one LED 129a of the LED assembly 129 is shown in the figure, a plurality of LEDs 129a are mounted on the PCB 129b and spaced apart from each other with a predetermined interval. The LEDs 129a receive electric power from the outside.

Here, the PCB 129b is a electrical circuit board, which includes signal line patterns (not shown) formed on an insulating layer such as resin or ceramic such as various electric elements are mounted and electrically connected with each other thereon. The PCB 129b may be Flame Retardant 4 PCB (FR4 PCB) of epoxy, flexible PCB (FPCB), or metal core PCB (MCPCB). The LED assembly 129 is attached to one side wall of the cover bottom 150 by an adhesive material, for example, a both-sided sticky tape, such that the PCB 129b contacts an inner surface of the side wall of the cover bottom 150.

Recently, to quickly discharge the heats form the LEDs 129a, the MCPCB has been widely used. In the MCPCB, an insulating layer (not shown) of polyimide resin, desirably, may be further formed to electrically disconnect the MCPCB 129b of a metallic material with the signal line patterns. Accordingly, the heats from the LEDs 129a are transmitted to the MCPCB 129b and quickly discharged to the outside.

The LED assembly 129 is disposed at the inner surface of the LED housing 200 including the first portion 201 and the second portion 203, wherein the first portion 201 has the opened inner side facing the light-incident surface of the light guide plate 123 and contacts the side wall of the cover bottom 150, and the second portion 203 guides the upper side of the LED assembly 129 in the context of the figure.

The LED assembly 129 is arranged such that a bottom surface of the PCB 129b, which is opposite to a surface on which the LEDs 129a are mounted, is disposed on the inner surface of the first portion 201. The LED assembly 129 is fixed to the LED housing 200 by an adhesive material (not shown) such as a both-sided sticky tape. The upper and outer sides of the LED assembly 129 are guided by the LED housing 200.

Accordingly, lights emitted from the LEDs 129a face the light-incident surface of the light guide plate 123 and are incident on the light-incident surface of the light guide plate 123. The lights are refracted toward the liquid crystal panel 110 inside the light guide plate 123. With lights reflected on by the reflection sheet 125, the lights are changed to have uniform brightness and high qualities while passing through the plurality of optical sheets 121 and are provided to the liquid crystal panel 110.

Here, since the second portion 203 of the LED housing has the width "w" to cover the part of the light guide plate 123 including the light-incident surface facing the LED assembly 129, all the lights emitted from the LEDs 129a are guided to be incident on the inside of the light guide plate 123 through the light-incident surface of the light guide plate 123.

Therefore, the loss of light, which occurs between the LED assembly 129 and the light guide plate 123, can be prevented, and it can be solved to lower qualities of the LCD device such as decreases in the brightness and image qualities.

In addition, since the LED housing 200 is formed of a metallic material, the heats from the LEDs 129a are transmitted to the LED housing 200 through the MCPCB 129b and the transmitted to the cover bottom 150 contacting the LED housing 200, thereby being discharged to the outside. Accordingly, the heats from the LED 129a can be quickly and efficiently discharged to the outside. Thus, the lowering in the image qualities due to change of the brightness can be prevented.

Figure 7:
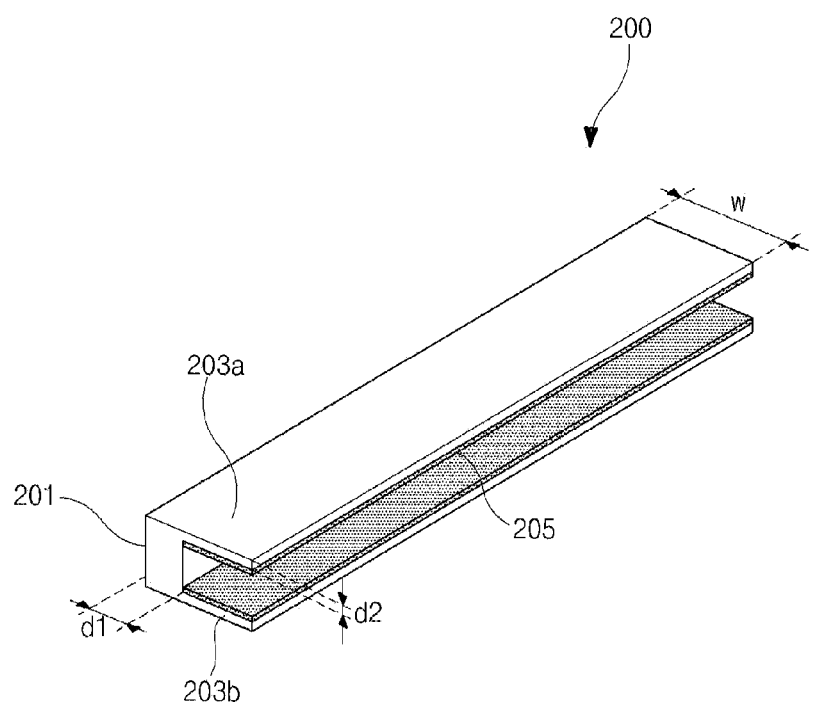

In the meantime, as shown in FIG. 7, the LED housing 200 may include a first portion 201, a second portion 203a and a third portion 203b. The first portion 201 has an opened inner side, which faces the light-incident surface of the light guide plate 123 of FIG. 4, and contacts the side wall of the cover bottom 150 of FIG. 4. The second portion 203a is perpendicular to the first portion 201 and guides an upper side of the LED assembly 129 of FIG. 4 in the context of the figure. The third portion 203b is parallel to the second portion 203a and guides a lower side of the LED assembly 129 of FIG. 4 in the context of the figure. In other words, the second portion 203a and the third portion 203b are disposed at opposite sides of the first portion 201, and the first portion 201 has a width and a thickness different from the second portion 203a and the third portion 203b. The third portion 203b may have the same thickness as the second portion 203a.

Accordingly, the LED housing 200 has a cross-section of a cornered U-like shape to cover the upper, lower and outer sides of the LED assembly 129 of FIG. 4 in the context of the figure. The LED housing 200 has a length corresponding to the LED assembly 129 of FIG. 4, and the second portion 203a and the third portion 203b of the LED housing 200 have a width "w" so as to completely cover the upper and lower sides of the LED assembly 129 of FIG. 4 in the context of the figure. Here, it is desirable that the second portion 203a of the LED housing 200 also covers a part of the light guide plate 123 of FIG. 4 facing the LED assembly 129 of FIG. 4.

The PCB 129b of FIG. 4 of LED assembly 129 of FIG. 4 is attached to the first portion 201 of the LED housing 200 by an adhesive material (not shown) such as a both-sided sticky tape. Here, to further increase discharge effects of heat, the thickness "d1" of the first portion 201 of the LED housing 200, beneficially, is thicker than the thickness "d2" of the second portion 203a and the third portion 203b. A direction of the thickness "d1" of the first portion 201 is perpendicular to a direction of the thickness "d2" of the second portion 203a and the third portion 203b.

A reflective layer 205 having relatively high reflectance may be formed on an inner surface of the LED housing 200, which faces the LED assembly 129 of FIG. 4, and more particularly, the reflective layer 205 may be formed on inner surfaces of the second portion 203a and the third portion 203b.

Figure 8:
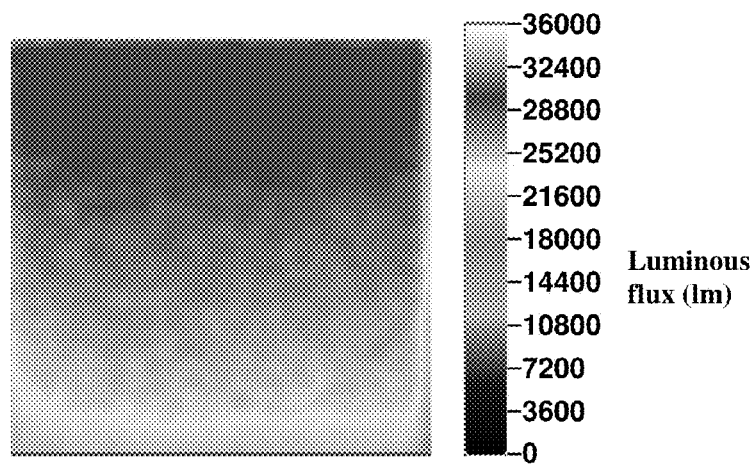

FIG. 8 is a view of showing a simulation result of changes in luminous flux after lights emitted from the LEDs are changed into a plane light source by the light guide plate according to the present invention. Here, the unit of luminous flux is lm (lumen) in the International System of Units. As the luminous flux gets high, the quantity of light also gets high.

In the simulation result, as it goes from green to red, the luminous flux gets high. That is, there is no luminous flux in green, and the luminous flux increases as it goes from yellow to red.

Here, an ideal change in the luminous flux is as follows. There is no luminous flux in a side edge portion of the LCD device, where the LEDs 129a of FIG. 4 are disposed and which is a non-display area excluding pixels, and thus the side edge portion is shown as green. In the other portions of the LCD device, where the lights emitted from the LEDs 129a of FIG. 4 are incident on the light guide plate 123 of FIG. 4 and changed into the plane light source, there is high luminous flux, and thus the other portions are shown as red.

According to FIG. 8, in the present invention, the side edge portion corresponding to the LEDs 129a of FIG. 4 is shown as green, and the other portions are shown as red. Therefore, in the prevent invention, the luminous flux is ideally changed.

When a total luminous flux of the lights emitted from the LEDs 129a of FIG. 4 is 100 lm, the plane light source from the light guide plate 123 of FIG. 4 has the luminous flux of 98.15 lm. Accordingly, the luminous flux is increased by about 20 lm as compared with 79.74 lm of the relate art.

Meanwhile, there may be a problem that the LEDs 129a of FIG. 4 are not accurately mounted on the PCB 129b of FIG. 4 and the LEDs 129a of FIG. 4 have tilting angles with respect to the PCB 129b of FIG. 4.

If the LEDs 129a of FIG. 4 have tilting angles with respect to the PCB 129b of FIG. 4, all the lights emitted from the LEDs 129a of FIG. 4 are not incident on the light-incident surface of the light guide plate 123 of FIG. 4, and the luminous flux decreases.

FIGS. 9A to 9C are views of showing simulation results of changes in luminous flux after the lights emitted from the LEDs are changed into a plane light source by the light guide plate according to the related art. FIGS. 10A to 10C are views of showing simulation results of changes in luminous flux after the lights emitted from the LEDs disposed inside the LED housing are changed into a plane light source by the light guide plate according to the present invention.

In FIG. 9A, the LEDs have a tilting angle of 6.3 degrees with respect to the PCB, and the luminous flux is 45.04 lm. In FIG. 9B, the LEDs have a tilting angle of 14 degrees with respect to the PCB, and the luminous flux is 41.07 lm. In FIG. 9C, the LEDs have a tilting angle of 23.2 degrees with respect to the PCB, and the luminous flux is 36.76 lm.

According to the results, yellow is shown between the LEDs and the light-incident surface of the light guide plate, and there is loss of light.

When the LEDs are not accurately mounted on the PCB and the LEDs have the tilting angle with respect to the PCB, there exists more loss of light. As the tilting angle gets larger, the loss of light increases.

On the other hand, when the LED assembly is guided by the LED housing according to the present invention, in FIG. 10A, the LEDs have a tilting angle of 6.3 degrees with respect to the PCB, and the luminous flux is 98.17 lm. In FIG. 10B, the LEDs have a tilting angle of 14 degrees with respect to the PCB, and the luminous flux is 97.66 lm. In FIG. 10C, the LEDs have a tilting angle of 23.2 degrees with respect to the PCB, and the luminous flux is 96.34 lm.

Accordingly, if the LED assembly is guided by the LED housing, even though the LEDs have the tilting angle with respect to the PCB, the loss of light can be prevented between the LED assembly and the light guide plate. In addition, it can be prevented to lower qualities of the LCD device such as the brightness and image qualities.

Moreover, since the LED housing is formed of a metallic material, the heats from the LEDs are transmitted to the LED housing through the MCPCB and then transmitted to the cover bottom contacting the LED housing, whereby the heats can be quickly and efficiently discharged to the outside. Thus, the lowering in the image qualities due to change of the brightness can be prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a support main having a rectangular frame shape with a substantially flat bottom surface;
    a reflection sheet;
    a light guide plate over the reflection sheet;
    a light-emitting diode (LED) assembly including a plurality of LEDs arranged along a light-incident surface of the light guide plate and a printed circuit board (PCB) on which the LEDs are mounted;
    an LED housing partially covering the LED assembly and including a first portion and a second portion, wherein the PCB is attached to the first portion, and the second portion is perpendicular to the first portion;
    a plurality of optical sheets over the light guide plate;

a liquid crystal panel over the plurality of optical sheets;

a bottom cover at a rear surface of the reflection sheet and having at least one side wall; and a top cover covering edges of a front surface of the liquid crystal panel and combined with the support main and the bottom cover, wherein an entire top outer surface of the second portion of the LED housing directly contacts the bottom surface of the support main, wherein a reflective layer is formed only on an inner surface of the second portion of the LED housing that faces the LED assembly, wherein one end of the reflective layer is disposed between the light guide plate and the liquid crystal panel, and wherein an air gap exists between reflective layer and the light guide plate.

2. The device according to claim 1, wherein the LED housing is formed of a metallic material, and the first portion has a thicker thickness than the second portion.

3. The device according to claim 1, wherein the second portion covers a part of the light guide plate including the light-incident surface.

4. The device according to claim 1, wherein the LED housing has an L-shaped cross-section.

5. The device according to claim 1, wherein the LED housing further includes a third portion parallel to the second portion, wherein the third portion and the second portion are disposed at opposite sides of the first portion.

6. The device according to claim 5, wherein the LED housing has a cross-section of a cornered "U"-like shape.

7. The device according to claim 5, wherein a thickness of the second portion is equal to a thickness of the third portion.

8. The device according to claim 1, wherein each of the LEDs emits one of red, green and blue light.

9. The device according to claim 1, wherein a width of the second portion of the LED housing is equal to a width of the support main.

10. The device according to claim 9, wherein an outer vertical surface of the first portion of the LED housing is flush with an outer vertical surface of the support main.

* * * * *